(12) United States Patent
Dykman et al.

(10) Patent No.: US 9,796,829 B2
(45) Date of Patent: Oct. 24, 2017

(54) METHOD OF PRODUCTION OF CROSS-LINKED SPHERICAL GRANULES OF DIVINYLBENZENE CO-POLYMERS

(71) Applicant: OOO "NAUCHNO-PROIZVODSTVENNOE OBEDINENIE EUROCHIM", St. Petersburg (RU)

(72) Inventors: Arkadii S. Dykman, St. Petersburg (RU); Elena V. Fedorcova, St. Petersburg (RU); Dmitriy N. Zhukov, St. Petersburg (RU); Mariya S. Reshetnikova, Vereshchanginskii (RU)

(73) Assignee: OOO "Nauchno-Proizvodstvennoe Obedinenie EUROCHIM", St. Petersburg (RU)

( * ) Notice: Subject to any disclaimer, the term of this patent is extended or adjusted under 35 U.S.C. 154(b) by 294 days.

(21) Appl. No.: 14/804,840

(22) Filed: Jul. 21, 2015

(65) Prior Publication Data

US 2016/0168355 A1 Jun. 16, 2016

(30) Foreign Application Priority Data

Dec. 10, 2014 (RU) .............................. 2014149970

(51) Int. Cl.
*C08K 5/20* (2006.01)
*C08F 212/36* (2006.01)

(52) U.S. Cl.
CPC ............. *C08K 5/20* (2013.01); *C08F 212/36* (2013.01)

(58) Field of Classification Search
CPC .......... C08K 5/20; C08F 12/36; C08F 12/362; C08F 212/36
See application file for complete search history.

(56) References Cited

U.S. PATENT DOCUMENTS 5,599,889 A 2/1997 Stoever et al.
2009/0326081 A1 12/2009 Irgum et al.

FOREIGN PATENT DOCUMENTS

RU 93002986 11/1996

OTHER PUBLICATIONS

Bai et al. Narrow-Disperse or Monodisperse Crosslinked and Functional Core-Shell Polymer Particles Prepared by Two-Stage Precipitation Polymerization. Journal of Applied Polymer Science, vol. 100, 1776-1784 (2006).*
Li et al. Monodisperse Cross-Linked Core-Shell Polymer Microspheres by Precipitation Polymerization. Macromolecules 2000, 33, 4354-4360.*
Kai Li, Functional Crosslinked Polymer Microspheres, 1994; http://digitalcommons.mcmaster.ca/opendissertations/2413.
Hengli Cui et al, Synthesis of Monodisperse Crosslinked Polystyrene Microspheres via Dispersion Copolymerization with the Crosslinker-Postaddition Method, Journal of Applied Polymer Science, 2008, pp. 3909-3916, vol. 107, No. 6., Wiley Periodicals, Inc.
Ching Wang et al, Fine Control of the Porous Structure and Chromatographic Properties of Monodisperse Macroporous Poly(styrene-co-divinylbenzene) Beads Prepared using Polymer Porogens, Journal of Polymer Science: Part A Polymer Chemistry. 1994, pp. 2577-2588, vol. 32 John Wiley & Sons, Inc.
Sang Eun Shim, Mechanism of the Formation of Stable Microspheres by Precipitation Copolymerization of Styrene and Divinylbenzene, Journal of Polymer Science: Part A: Polymer Chemistry, 2004, pp. 3967-3974, vol. 42, Wiley Periodicals, Inc.
Jung Min Lee et al, Mechanism of the Formation and Growth of the Cross-Linked Poly(divinylbenzene) Spheres Using Poly(styrene-block-4-vinylpyridine), Macromolecules, 2008, pp. 2037-2044, vol. 41, No. 6.

* cited by examiner

*Primary Examiner* — John Uselding
(74) *Attorney, Agent, or Firm* — Patentbar International, P.C.

(57) ABSTRACT

Production of monodisperse spherical granules of divinylbenzene co-polymers, used as sorbents, utilizes precipitative polymerization of divinylbenzene with substituted styrenes or derivatives of acrylic acid in the environment of acetonitrile in presence of an initiator and a stabilizer at the temperature ranging from 50 ° C. to 82 ° C. and mixing. Amides of aliphatic carbonic acids are used as low-molecular stabilizers, with the common formula:

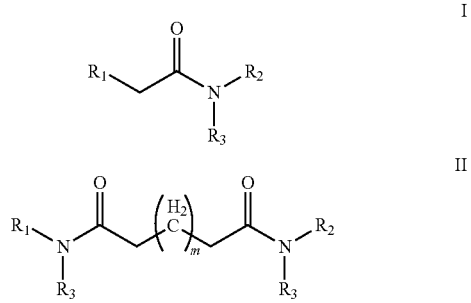

where $R_1$ is an alkyl with 5 to 10 carbon atoms, an aryl alkyl with 7 to 10 carbon atoms; $R_2$ $R_3$ is an alkyl with 1 to 4 carbon atoms, or biradical with 3 to 5 carbon atoms; m ia a total number of carbon atoms in the direct or branched chain ranging from 2 to 14; the concentration of the stabilizer in the reaction mixture is from $2 \cdot 10^{-3}$ to 0.2 mole/l; the size of the monodisperse microspheres ranges between 0.2 and 4.0 micron.

3 Claims, No Drawings

METHOD OF PRODUCTION OF CROSS-LINKED SPHERICAL GRANULES OF DIVINYLBENZENE CO-POLYMERS

RELATED APPLICATIONS

This application claims priority to Russian Patent Application No. RU2014149970, filed Dec. 10, 2014, which is incorporated herein by reference in its entirety.

FIELD OF THE INVENTION

This invention is related to the field of production of polymer spherical granules, used in gaseous and liquid chromatography as sorbents, which can be applied in different industries to specify the composition of multi-component mixtures.

BACKGROUND OF THE INVENTION

There are the following requirements to the stated polymer spherical particles: they must be mechanically strong, homogeneous by their chemical composition, have the certain size and size distribution.

There is a number of methods of production of polymer microspheres with the size of 1-10 micron, containing 0.5-80% of linking agent.

These microspheres can be produced by suspension polymerization.

There is a method of production of macroporous nonionic sorbents by suspension polymerization of pure or technological divinylbenzene in presence of a radical initiator and a porogene at heating. At that, azeotropic mixtures of aromatic and aliphatic compounds with the common boiling temperature of at least 80° C. are used as porogenes. (application RU 93002986, 1996).

However, the stated method of dispersion of the monomer and the initiator, soluble in the monomer, in the uninterrupted phase in presence of steric stabilizer allows to produce highly cross-linked particles with wide size distribution.

The co-polymer microspheres with the size of 1-10 micron with narrow size distribution are produced at one stage by the method of dispersion polymerization.

According to this method, the reaction starts in initially homogeneous solution, and then the polymer particles are distilled into separate phase and grow further to their final size. The process is performed in presence of steric stabilizers. However, this method does not allow to produce microspheres with the content of linking agent more than 10-15% (J. Appl. Polymer Sci. 2008. Vol. 107, N 6. P. 3909-3916.).

Microspheres with the content of linking agent more than 10-15% can be produced with two-stage method of radical polymerization, suggested by Ugelstad, according to which the radical microspheres, produced beforehand and stabilized in the uninterrupted phase, are treated with a substance, simplifying their inturgescence, and then with the linking agent. As the result of polymerization, the microspheres containing linear polymer are formed. However, these microspheres are chemically heterogeneous and in presence of appropriate solvents the linear polymer can be easily taken out of them, forming the macropores (J. Polymer Sci.: Part A Polymer Chemistry. 1994. Vol. 32, P. 2577-2588). Consequently, these microspheres are not as strong as their highly cross-linked analogues, and cannot be applied in situations where high mechanic strength is required, for instance, at production of columns for ultra-productive liquid chromatography (UPLC).

Highly cross-linked monodisperse microspheres with the size of about 1-8 micron and containing 45-80% of linking agent, can be produced by the method of precipitative polymerization. The method comprises the performance of polymerization in the environment, dissolving the initiator, monomer and linking agent. At the early stage of the reaction the oligomers form a separate phase and then microspheres, which gain colloidal stability due to mechanic strength and salvation of free linear oligomers by the solvent, as their degree of cross-linking increases. According to this method, the reaction can be performed mainly in solvents with the properties as good as those of teta-solvents in relation to polymer, and monomers containing at least 45% of linking agent should be used. The method allows to produce chemically homogeneous polymer microspheres, suitable to use as matrix for sorbent production in such fields as UPLC.

The method of precipitative polymerization is described in a number of works taking as the example mainly the polymerization of technology divinylbenzene 55 (DVB-55) or DVB-80, containing respectively 55 or 80% of linking agent and its mixtures with functionalized monomers, such as 4-chlorine methyl styrene, glicidyl acrylate and others. In the work (Journal of Polymer Science: Part A: Polymer Chemistry. 2004. Vol. 42. P. 3967-3974) the method of polymerization of divinylbenzene in acetonitrile at the temperature of 70° C. in presence of azoisobutyronitrile. The monomer is taken in the amount of 2-15% of the solvent volume; the polymerization is performed in a water bath, equipped by a shaker, which allows to produce monodisperse microspheres with the diameter of 2.9-3.8 micron, depending on the ratio of reagents.

There is also the method of precipitative polymerization of divinylbenzene in acetonitrile at the temperature of 30° C., where the radical decomposition of isobutyronitrile is initiated photochemically (U.S. 20090326081 A1, 2009). Shaking of the mixture is performed by a special rotatory device, which rotates the vessels with reaction mass around its horizontal centerline. The method allows to use solutions of 2-10% monomer of the solvent volume and produce the microspheres with average diameter of 1.4-3.9 micron, depending on the concentration of the monomer and the initiator.

The common disadvantage of the stated methods of polymerization is the impossibility to regulate the size of produced microspheres, as their size is closely connected with other process parameters, which finally determine the outcome of the polymer. According to the examples given in the existing methods, the size of polymer microspheres decreases as the monomer concentration is reduced and, respectively, grows when it is increased. Therefore, the size of microspheres depends on the outcome of the polymer from a volume unit of the reaction mass, which reduces economic efficiency of the existing methods at production of the small size microspheres. Similarly, the smaller size microspheres can be reached by reducing the concentration of the initiator, which also determines the dependence between the polymer outcome and microsphere size.

There is also a method of production of polymer microspheres based on divinylbenzene 50 or 80 and its co-polymers, where functionalized styrenes, such as chlorine methyl styrene and acrylates, mainly glicidyl metacrylate, are used as co-monomers. The process is performed in acetonitrile at basic monomer load of 2% of the reaction mixture volume. 2,2-Azobisisobutyronitrile in the concentration of 0-20% is used as the initiator, the reaction mixture is shaked by smooth rotation of vessels around the horizontal centerline of the mixing device. (Patent U.S. Pat. No. 5,599,889, 1997)

The method of the present invention regulates the size of microspheres using the binary mixtures of acetonitrile and other solvents as reaction environment for polymerization. However, this makes the reactivation and purification of the solvents at repeated use more difficult and, more important, leads to the deterioration of size distribution of the microspheres, as shown in the examples of the use of acetonitrile and propionitrile mixture and acetonitrile and water mixture.

The closest analogue of the suggested invention is the method of production of monodisperse co-polymer microspheres of divinylbenzene, described in (Li K. Functional Cross-linked Polymer Microspheres, 1994; http://digital-commons.mcmaster.ca/opendissertations/2413).

It is also based on the precipitative polymerization of divinylbenzene and related compounds in homogeneous solution. The typical process comprises the use of 2-4 vol. % DVB-55 or DVB-80 solution in pure acetonitrile and 2,2'-azobisisobutyronitrile (AIBN) as the initiator in the amount of 2% wt. (in relation to the total amount of the monomer).

The polymerization is performed in the polymer vessels with the volume of 30 to 1000 ml, rotating them around the long centerline to prevent subsidence if the formed microspheres and further coagulation. The reaction temperature is increased to 70° C. in 2 hours, and then kept 70° C. during 24 hours. The conversion is 40 to 60%, which is determined by low concentrations of the monomer and the initiator.

According to the known method, the substituted styrenes, mainly chlorine methyl styrene in the concentration of 0-20% in relation to the total amount of the monomer, acrylic monomers, mainly glicidyl metacrylate mixed with divinylbenzene, containing at least 50% of linking agent, can be used as co-monomers.

Azo-initiators, mainly 2,2'-azobisisobutyronitrile in the concentration of 0-20%, initiators of peroxide type, mainly benzoyl peroxide, can be used as initiators.

It is suggested to use acetonitrile and its mixtures with water (in the concentration of 1-7% wt. of the reaction mixture volume), with propionitrile (in the concentration of 1-60% wt. of the reaction mixture volume), with toluol as porogeneous agent (in the concentration of 40% wt. max of the reaction mixture volume) as solvents.

To reduce the size of formed cross-linked microspheres it is suggested to use polymer stabilizers. It is demonstrated, that the use of polyvinyl pyrrolydone in the concentration of 16 g/l to 48 g/l allows to reduce the size of microspheres from 2.68 micron to submicron size at initial monomer load of 10 wt. % of acetonitrile volume.

The disadvantage of known method is the fact that polymer stabilizers are effectively sorbed on the surface of the microspheres, and, as the result, their desorbtion rate is rather low. The existence of multiple centers, capable of transferring the chain, leads to the intrusion of the stabilizer into the microspheres' structure, which results in their chemical heterogeny. The influence of inoculation of the stabilizer on the microspheres' structure is shown in the polymerization of divinylbenzene in presence of poly(styrene-bulk-4-vinylpyridine) (Lee J. M., Saikia P. J., Lee K.//Macromolecules. 2008.Vol 41, N 6. P. 2037-2044).

SUMMARY OF THE INVENTION

The object of the present invention is the production of monodisperse microspheres of co-polymers of divinylbenzene of the required size between 0.2 and 4.0 micron and containing at least 45% of linking agent under conditions providing the maximum outcome of the target product from the volume unit of the reaction mixture.

DETAILED DESCRIPTION OF THE PREFERRED EMBODIMENTS

According to the present invention, its stated and other objects are reached by the precipitative polymerization of divinylbenzene and its co-polymerization with other monomers at the temperature of 50-82° C. in the environment of acetonitrile with shaking in presence of an initiator and low-molecular stabilizer.

The method of the present invention uses amides of aliphatic carbonic acids of the common formula (I) and (II) as stabilizers, because they are low-molecular surfactant stabilizers

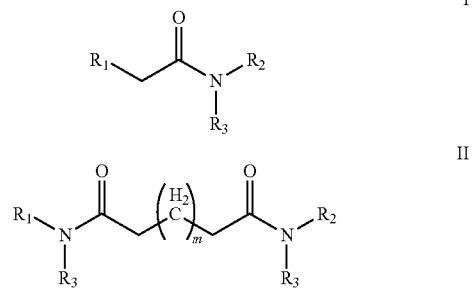

where
radical $R_1$—alkyl with the number of carbon atoms 5-10, aryl alkyl with common number of carbon atoms 7-10;
radicals $R_2$, $R_3$—alkyl with the number of carbon atoms 1-4,or biradical with the number of carbon atoms 3-5.
m—total number of carbon atoms in the direct or branched chain equal to 2-14.

Amides containing 8-14 carbon atoms are the most effective stabilizers. The effect of the stabilizer is to a large extent determined by its chemical nature and depends mainly on the ratio of polar and non-polar parts of a molecule. The microspheres' size is in the bell-shaped dependence on the concentration of the stabilizer, as it is the result of the effect of two factors: inturgescence of the microspheres and increase of colloidal stability of the system. According to the present invention, the concentration of low-molecular stabilizer in the reaction mixture is between $2 \cdot 10^{-3}$ mole/l and 0.2 mole/l at concentrations higher than 0.2 mole/l the microspheres with bimodal size distribution are formed.

According to this method, technology divinylbenzene containing 50 to 80% of isomeric meta- and para-divinylbenzenes mixed with meta- and para-ethylstyrenes can be used as monomer. It is also possible to produce co-polymers containing at least 45% of divinylbenzene, where the derivatives of acrylic acid, such as alkyl acrylates, alkyl metacrylates, in particular, glicidyl acrylate, substituted styrenes, such as alkyl styrenes, vinylbenzyl chloride, vinylbenzyl glicidyl ether, vinylbenzyl acetate can be used as co-monomers.

The total concentration of monomer in the solution is between 2 and 15%. The application of concentrations lower than 2% is not efficient as the outcome of the polymer is reduced due to the increase of possibility of radicals recombination and ineffective use of the initiator. The stability of the colloidal system is decreased as the concentration of monomer increases, and at the concentration of more than 15% the microspheres coagulation in the whole volume of the system is observed.

The initiators of azo-type, AIBN in the concentration of 0-10% of the monomer weight, mainly 2-4% of the monomer weight, are used as the initiators.

The mixing of the reaction mass is performed by a few methods: by boiling the reaction mass or by using upper-driving mechanic mixer or shaker. Application of mixing methods of low intensity allows to use higher concentrations of the monomer, which allows to increase the outcome of the product from the volume unit of the reaction mixture.

The substantial difference of the suggested method of production of monodisperse cross-linked spherical granules of divinylbenzene co-polymers is the performance of the process in presence of low-molecular stabilizer, which is an amide of an aliphatic acid of the common formula

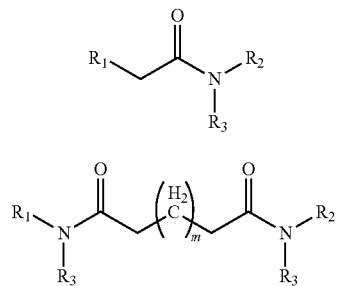

where
radical $R_1$—alkyl with the number of carbon atoms 5-10, aryl alkyl with the total number of carbon atoms 7-10;
radicals $R_2$, $R_3$—alkyl with the number of carbon atoms 1-4, or biradical with the number of carbon atoms 3-5.
m—total number of carbon atoms in the direct or branched chain equal to 2-14.

The inventive method allows to produce monodisperse microspheres of divinylbenzene co-polymers of the required size between 0.2 and 4.0 micron and containing at least 45% of linking agent under conditions, providing the maximum outcome of the target product per volume unit of the reaction mixture. According to this invention, the outcome of the polymer is 18-65 g per 1 l of the mixture at the total outcome in the reaction of 47-73%, which is determined only by the concentration of the components in the source solution.

The industrial applicability of the inventive method is proved by the following examples.

EXAMPLE 1

Acetonitrile, monomer with the concentration of the required percent of the total volume of the reaction mass, the initiator (AIBN) in the amount of 2% of monomer weight and the stabilizer sample weight are placed into the three-necked reaction vessel equipped with a reverse cooler and a capillary down to the bottom. The content of the reactor is blown off during 30 minutes with nitrogen to remove oxygen. The reaction mass is further placed into the oil bath, heated beforehand, and heat to the temperature of 50-82° C. After finishing the reaction and cooling the reaction mass the polymer is filtered, washed by tetrahydrofurane and dried to the stationary mass. The experimental results with the said stabilizers and their concentration in the reaction mixture are shown in the Table.

| N | Stabilizer | Concentration in the mixture wt. %. | Monomer | Concentration, vol. %. | Average microsphere size, micron. | PDI[1] | Outcome, % |
|---|---|---|---|---|---|---|---|
| 1 | $N^1,N^1,N^{10},N^{10}$-Tetramethyl dekan-diamide, (IIa) | 0.5 | DVB-80 | 4 | 0.9 | 1.05 | 48 |
| 2 | | 1 | | | 2.2 | 1.04 | 47 |
| 3 | | 1.75 | | | 2.4 | 1.08 | 47 |
| 4 | | 2.5 | | | 1.6 | 1.03 | 49 |
| 5 | N,N-dimethyl hexanamide, (Ia) | 0.5 | DVB-80 | 4 | 1.6 | 1.06 | 46 |
| 6 | | 1 | | | 2.6 | 1.03 | 48 |
| 7 | | 1.75 | | | 3.2 | 1.09 | 50 |
| 8 | | 2.5 | | | —[2] | — | 47 |
| 9 | $N^1,N^1,N^{12},N^{12}$-tetramethyl dodekan-diamide, (IIb) | 1 | DVB-80 | 4 | 1.2 | 1.04 | 49 |
| 10 | IIa | 0.5 | DVB-55 | 4 | 2.9 | 1.08 | 49 |
| 11 | Ia | 1.78 | DVB-80 and EA[3] | 4 | 0.8 | 1.11 | 46 |
| 12 | IIa | 0.5 | DVB-80 and VBGE[4] | 4 | 2.9 | 1.07 | 48 |
| 13 | Mixture Ia and IIa | 0.1% and 0.3% | DVB-80 | 6 | 2.8 | 1.1 | 56 |
| 14 | Mixture Ia and IIb | 0.8% and 0.1% | DVB-80 | 4 | 2.7 | 1.02 | 73[5] |
| 15 | Absent | — | DVB-80 | 4 | 3.5 | 1.12 | 47 |

[1] Polydispersion index.
[2] Bimodal distribution.
[3] Ethyl acrylate; Monomer ratio 3.35/1 (wt.) respectively.
[4] Vinyl benzyl glicidyl ether; monomer ratio 3.75/1 (wt.) respectively.
[5] 4% AIBN of monomer weight is loaded.

What is claimed is:
1. A method of producing monodisperse cross-linked spherical granules of divinylbenzene co-polymers, the method comprising precipitately polymerizing divinylbenzene with substituted styrenes or derivatives of acrylic acid in an environment of acetonitrile in the presence of an initiator and a stabilizer at a temperature during mixing; and
using a low-molecular stabilizer of amides of aliphatic carbonic acids as the stabilizer in the co-polymerization process, the amides of aliphatic carbonic acids having a common formula I and/or II:

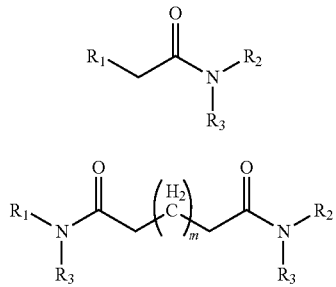

where
radical $R_1$, is an alkyl with a number of carbon atoms from 5 to 10, an aryl alkyl with a total number of carbon atoms from 7 to 10;
radicals $R_2$, $R_3$ are an alkyl with a number of carbon atoms from 1 to 4, or a biradical with a number of carbon atoms from 3 to 5, m—a total number of carbon atoms in a direct of branched chain being from 2 to 14; and wherein a concentration of the stabilizer ranges from $2 \cdot 10^{-3}$ to 0.2 mole/l.

2. The method according to the claim 1, wherein N,N-dimethyl hexanamide, $N^1,N^1,N^{10},N^{10}$-tetramethyl decandiamide $N^1,N^1,N^{12},N^{12}$-tetramethyl dodekandiamide or N,N-dimethyl octanamide are used as the stabilizer.

3. The method according to the claim 1 carried out at the temperature selected from a range from 50° C. to 82° C.

* * * * *